1,601,174

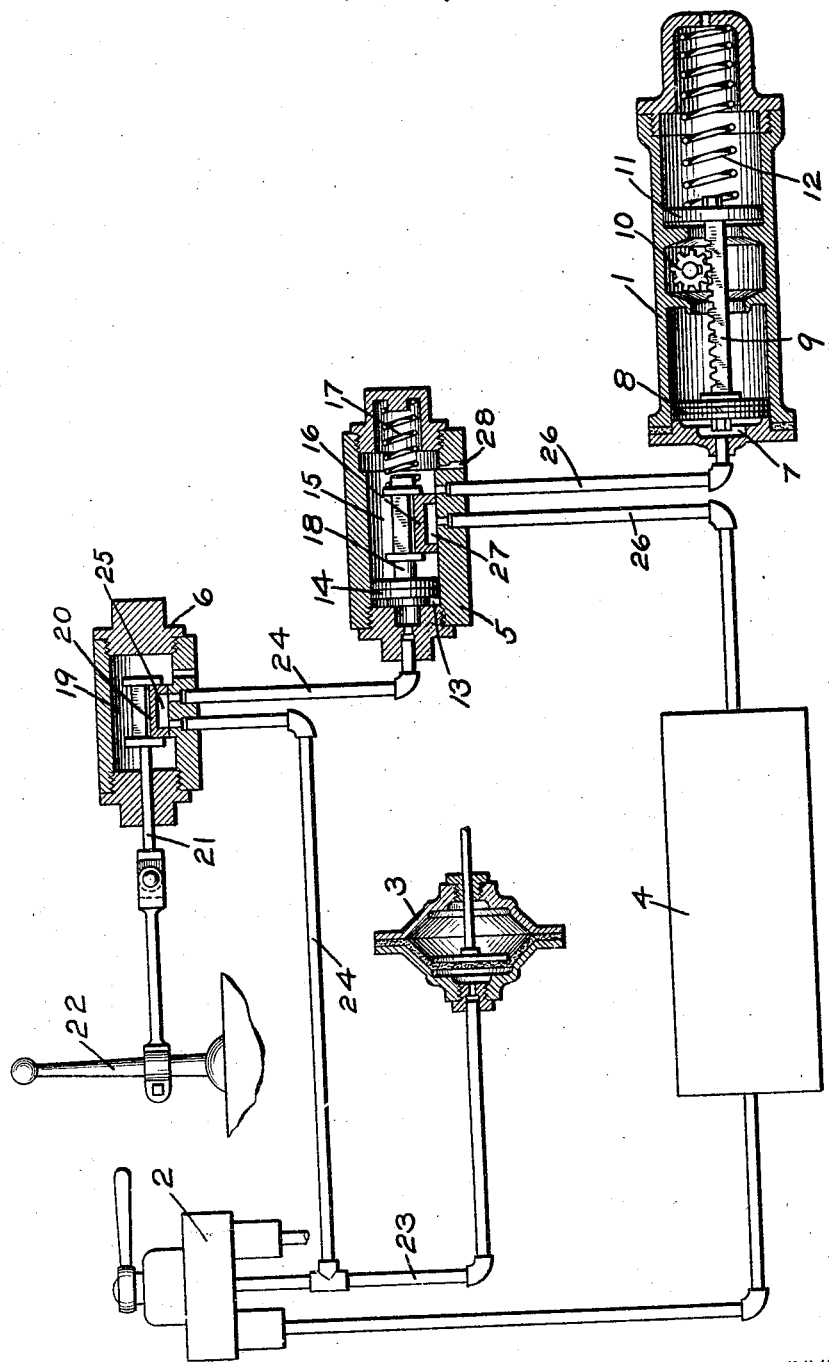
Sept. 28, 1926.
H. D. HUKILL
DOOR AND BRAKE CONTROL DEVICE
Filed Sept. 30, 1924
1,601,174
INVENTOR
HENRY D. HUKILL
BY *Wm. M. Cady*
ATTORNEY Patented Sept. 28, 1926.

UNITED STATES PATENT OFFICE.

HENRY D. HUKILL, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

DOOR AND BRAKE CONTROL DEVICE.

Application filed September 30, 1924. Serial No. 740,739.

This invention relates to motor vehicles and more particularly to a means for controlling the doors of the vehicle.

The principal object of my invention is to provide means for effecting the opening of the vehicle doors upon a predetermined increase in pressure in applying the brakes on the vehicle.

In the accompanying drawing, the single figure is a diagrammatic view, partly in section, of a combined brake and door controlling apparatus embodying my invention.

As shown in the drawing, the equipment may comprise a vehicle door controlling engine 1, a brake valve device 2 for controlling the admission and release of fluid under pressure to and from a brake chamber 3, a source of fluid under pressure 4, a door controlling valve device 5, and a valve device 6 for controlling the operation of the valve device 5.

The door engine 1 may comprise a casing having a piston chamber 7 containing a piston 8 having attached thereto a rack bar 9 for operating a pinion 10, the rotation of pinion 10 being adapted to control the opening and the closing of the vehicle door. A spring plate 11 is carried by the outer end of the bar 9 and is subject to the pressure of a coil spring 12 which tends to move the bar 9 to the left hand position, as shown in the drawing, in which the vehicle door is held closed.

The valve device 5 comprises a casing having a piston chamber 13 containing a piston 14 and a valve chamber 15 containing a slide valve 16 adapted to be operated by piston 14. A spring 17 engages the outer end of the piston stem 18 and tends to maintain the piston 14 and slide valve 16 in the left hand position, as shown in the drawing.

The valve device 6 comprises a casing having a valve chamber 19 containing a slide valve 20 having an operating rod 21 which extends out of the casing and is operatively connected to a controlling element of the motor vehicle, such as the usual gear shift lever 22. When the lever 22 is in neutral position, as shown in the drawing, communication is established from brake chamber pipe 23 through pipe 24 and cavity 25 in slide valve 20 with piston chamber 13 and when the lever 22 is in one of its gear lock positions, communication through pipe 24 is cut off.

In operation, if the operator desires to bring the vehicle to a stop, he moves the brake valve device 2 to brake application position, in which fluid under pressure is supplied from the pressure reservoir 4 through the brake valve device to the brake cylinder pipe 23 and to the brake chamber 3.

In order to open the vehicle doors, the operator must first shift the gear shift lever 22 to neutral position, as shown in the drawing, so that the cavity 25 in slide valve establishes communication through pipe 24. Fluid pressure supplied to the brake chamber 3 is then supplied to piston chamber 7 and when the pressure of fluid supplied to the brake chamber has been increased to a predetermined degree, sufficient to overcome the pressure of spring 17, the piston 14 will be shifted toward the right, so that slide valve 16 is operated to establish communication from the pressure reservoir 4, through pipe 26 and cavity 27 in slide valve 16, to open piston chamber 7.

Fluid under pressure supplied to piston chamber 7 then shifts the piston 8 toward the right, rotating the pinion 10, so as to effect the opening of the vehicle door.

When the brakes are released by moving the brake valve 2 to release position, fluid under pressure is released from the brake chamber 3 and from the piston chamber 13, so that piston 14 is moved to its left hand position, in which the door engine side of pipe 26 is opened to valve chamber 15 and to the atmosphere by way of port 28. The release of fluid under pressure from piston chamber 7 permits the movement of piston 8 to its left hand position by the action of spring 12 and thereby the vehicle door is moved to its closed position.

Regardless of whether or not the brakes have been released, if the operator moves the gear shift lever 22 from its neutral position, the slide valve 20 will be shifted so as to cut off communication through pipe 24 and fluid under pressure will then be released from the piston chamber 13, so that the piston 14 will be moved to its left hand position and the door engine will be operated to close the vehicle door, as will be evident.

Having now described my invention, what I claim as new and desire to secure by Letters Patent, is:—

1. In a vehicle control apparatus, the combination with a door control device and a brake applying means, of means for effecting the operation of said door control device to open a vehicle door only when the brakes are applied at a predetermined pressure.

2. In a vehicle control apparatus, the combination with a fluid pressure door engine and a fluid pressure brake, of means operated upon a predetermined increase in the pressure of fluid supplied to apply the brakes for supplying fluid to operate the door engine and thereby effect the opening of a vehicle door.

3. In a vehicle control apparatus, the combination with a fluid pressure door engine and a fluid pressure brake, of means for controlling communication through which fluid under pressure is supplied to said door engine and operated upon a predetermined increase in the pressure of fluid supplied in applying the brakes for opening said communication.

4. In a vehicle control apparatus, the combination with a fluid pressure door engine and a fluid pressure brake, of a valve device controlled by the pressure of fluid supplied in applying the brakes for controlling communication through which fluid under pressure is varied on said door engine, a vehicle controlling member, and means operated by said member for controlling communication through which fluid under pressure is supplied to said valve device.

5. In a vehicle control apparatus, the combination with a fluid pressure door engine and a fluid pressure brake, of a valve device controlled by the pressure of fluid supplied in applying the brakes for controlling communication through which fluid under pressure is varied on said door engine, a gear shift lever, and means operated by the movement of said lever for controlling communication through which fluid under pressure is supplied to said valve device.

6. In a vehicle control apparatus, the combination with a fluid pressure operated door engine and a brake chamber, of a source of fluid under pressure, of a valve device operated by fluid supplied to said brake chamber in applying the brakes for supplying fluid under pressure from said source to said door engine, a gear shift lever, and means operated by the movement of said lever for opening communication through which fluid under pressure is supplied to said valve device.

In testimony whereof I have hereunto set my hand.

HENRY D. HUKILL.